(12) United States Patent
Wittenberg et al.

(10) Patent No.: US 9,264,232 B2
(45) Date of Patent: *Feb. 16, 2016

(54) CRYPTOGRAPHIC DEVICE THAT BINDS AN ADDITIONAL AUTHENTICATION FACTOR TO MULTIPLE IDENTITIES

(71) Applicant: Microsoft Corporation, Redmond, WA (US)

(72) Inventors: Craig Henry Wittenberg, Mercer Island, WA (US); Christian Paquin, Redmond, WA (US); Rushmi U. Malaviarachchi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/469,421

(22) Filed: Aug. 26, 2014

(65) Prior Publication Data

US 2016/0006567 A1   Jan. 7, 2016

Related U.S. Application Data

(63) Continuation of application No. 12/894,391, filed on Sep. 30, 2010, now Pat. No. 8,819,437.

(51) Int. Cl.
*H04L 29/06* (2006.01)
*H04L 9/32* (2006.01)

(52) U.S. Cl.
CPC .............. *H04L 9/32* (2013.01); *H04L 9/3226* (2013.01)

(58) Field of Classification Search
CPC ........ H04L 9/32; H04L 9/3213; H04L 9/3226

USPC ............... 713/172, 182, 185; 726/7
See application file for complete search history.

(56) References Cited

U.S. PATENT DOCUMENTS

| 5,604,805 | A  | 2/1997  | Brands |
| 5,696,827 | A  | 12/1997 | Brands |
| 6,643,774 | B1 | 11/2003 | McGarvey |
| 6,817,521 | B1 | 11/2004 | Matada |
| 7,236,956 | B1 | 6/2007  | Ogg et al. |

(Continued)

OTHER PUBLICATIONS

Vance, "Increasing Accountability through user-interface design artifacts: A new approach to addressing the problem of access-policy violations", Jun. 2015, MIS Quarterly, p. 345-366.*

(Continued)

*Primary Examiner* — Jason Lee
*Assistant Examiner* — Gregory Lane
(74) *Attorney, Agent, or Firm* — Aneesh Mehta; Sade Fashokun; Micky Minhas (57) ABSTRACT

Binding a security artifact to a service provider. A method includes generating a pseudonym for a security artifact. The pseudonym is an identifier of the security artifact to the service provider that is unique to the service provider in that the pseudonym is not used to identify the security artifact to other service providers. Further, the pseudonym uniquely identifies the particular security artifact to the service provider even when a user has available a number of different security artifacts to authenticate to the same service provider to access a user account for the user. The method further includes providing the pseudonym for the security artifact to the service provider. The pseudonym for the security artifact is bound with a user account at the service provider for a user associated with the security artifact.

19 Claims, 6 Drawing Sheets

(56) References Cited

U.S. PATENT DOCUMENTS

| | | | |
|---|---|---|---|
| 7,571,461 B2 | 8/2009 | Kwok et al. | |
| 2002/0023032 A1* | 2/2002 | Pearson et al. | 705/35 |
| 2005/0055316 A1 | 3/2005 | Williams | |
| 2005/0246529 A1 | 11/2005 | Hunt et al. | |
| 2005/0289343 A1 | 12/2005 | Tahan | |
| 2006/0031301 A1 | 2/2006 | Herz et al. | |
| 2006/0095787 A1 | 5/2006 | Aaron | |
| 2006/0095797 A1 | 5/2006 | Hung | |
| 2006/0174125 A1 | 8/2006 | Brookner | |
| 2006/0242066 A1 | 10/2006 | Jogand-Coulomb et al. | |
| 2007/0016798 A1* | 1/2007 | Narendra et al. | 713/189 |
| 2007/0101138 A1 | 5/2007 | Camenisch | |
| 2008/0114980 A1 | 5/2008 | Sridhar | |
| 2008/0168540 A1 | 7/2008 | Agarwal et al. | |
| 2008/0184349 A1* | 7/2008 | Ting | 726/7 |
| 2009/0182673 A1* | 7/2009 | Al-Herz | G06Q 20/108 705/66 |
| 2009/0193249 A1 | 7/2009 | Conrado et al. | |
| 2009/0265788 A1* | 10/2009 | Ehrenschwender et al. | 726/26 |
| 2010/0017603 A1 | 1/2010 | Jones | |
| 2010/0063929 A1* | 3/2010 | Torigai et al. | 705/44 |
| 2010/0100721 A1* | 4/2010 | Su et al. | 713/150 |
| 2010/0325441 A1 | 12/2010 | Laurie et al. | |
| 2011/0072266 A1* | 3/2011 | Takayama et al. | 713/169 |
| 2011/0087888 A1* | 4/2011 | Rennie | 713/182 |
| 2011/0202991 A1 | 8/2011 | Paquin et al. | |
| 2012/0042042 A1* | 2/2012 | Winkler et al. | 709/217 |
| 2012/0084565 A1 | 4/2012 | Wittenberg et al. | |

OTHER PUBLICATIONS

Third Office Action Issued in Chinese Patent Application No. 201110308641.X, Mailed Date: Jan. 23, 2015, 6 Pages.
U.S. Appl. No. 12/894,391, Nov. 19, 2012, Office Action.
U.S. Appl. No. 12/894,391, Aug. 1, 2013, Office Action.
U.S. Appl. No. 12/894,391, Apr. 16, 2014, Notice of Allowance.
Author Unknown, "Linux USB Authentication," Retrieved Aug. 16, 2010, http://usbauth.delta-xi.net/doku.php?id=feature_highlights.
Nadon, "Cryptographic Solutions for Financial Services," Feb. 2008, http://www.sun.com/blueprints/0208/820-4019.pdf.
Author Unknown, "Cryptographic Token Interface Standard," RSA Laboratories, Available as early as Sep. 29, 2010, ftp://ftp.rsasecurity.com/pub/pkcs/pkcs-11/v2-30/pkcs-11v2-30-d1.pdf.
Garman, Christina, et al. "Decentralized Anonymous Credentials," Oct. 15, 2013, Johns Hopkins University, p. 1-21.

* cited by examiner

CRYPTOGRAPHIC DEVICE THAT BINDS AN ADDITIONAL AUTHENTICATION FACTOR TO MULTIPLE IDENTITIES

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Connections between systems allows for on-line services to be implemented. Often, on-line services are intended to be accessed by specific parties while preventing other parties from accessing the on-line services. Thus, there may be a need to determine digital identity to ensure that on-line services are only provided to those for whom the services were intended. For example, identity can be claimed by use of a username and password. The username is a unique identifier at the on-line service that identifies the digital identity. The password may be some string that should only be known by the entity associated with the username. If a user can provide both the username and password when requesting services from an on-line service, there is some assurance that the user is authorized to access the services.

High-value online transactions use high level of identity assurance. Multi-factor authentication is a common mechanism for assuring identity in a transaction. For example, two-factor authentication using a smartcard is based on something you have (the smartcard) in conjunction with something you know (the PIN or password to unlock the card). One-time password generators and biometrics readers are other examples of devices that can provide an additional authentication factor.

Today, these devices are typically issued by the corresponding identity provider. For example, companies issue smartcards to their employees, some banks issue one-time password generators to their customers, and some governments issue smartcards to their citizens. If an individual uses several services that use multi-factor authentication, the user may have multiple authentication devices for use in these different scenarios.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein is directed to a method practiced in a computing environment. The method includes acts for binding a security artifact to a service provider. The method includes generating a pseudonym for a security artifact. The pseudonym is an identifier of the security artifact to the service provider that is unique to the service provider in that the pseudonym is not used to identify the security artifact to other service providers. Further, the pseudonym uniquely identifies the particular security artifact to the service provider even when a user has available a number of different security artifacts to authenticate to the same service provider to access a user account for the user. The method further includes providing the pseudonym for the security artifact to the service provider. The pseudonym for the security artifact is bound with a user account at the service provider for a user associated with the security artifact.

Another embodiment includes a method that may be practiced in a computing environment. The method includes acts for using a security artifact bound to a user account at a service provider. The method includes receiving a security artifact challenge from a service provider. The security artifact challenge includes a unique identifier for the service provider and a nonce. The unique identifier from the service provider and a unique identifier for a security artifact are used to generate the private key of an asymmetric key pair. The nonce is signed with the asymmetric private key. The signature on the nonce is sent to the service provider. The service provider validates the signature on the nonce to authenticate the security artifact. The service provider is accessed as a result of the service provider authenticating the identity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein include a security artifact, such as a cryptographic device or software module that provides an additional authentication factor that is reusable across accounts from multiple service providers. The device can be bound to an account so that it is used to authenticate, or it can be used to unlock security tokens that have already been issued by a service provider. Such tokens may be for example, SAML assertions or U-Prove tokens.

Note that as used herein, "service provider" may include a number of different entities working in concert to provide services to a user. For example, a service provider may include, in addition to the service that actually provides data or other services, verification services to verify a user's identity and/or credential, provisioning services that allow for supplying artifacts and/or binding the artifacts to a user, etc.

The device itself may take many forms, for example a tamper-resistant computing device such as a USB dongle or smart card with a CPU with an optional fingerprint reader, or an existing device (e.g. a SIM card in mobile phone), etc. Alternatively, a security artifact may be implemented in software. For example, embodiments may use a software-only emulation (such as code running in a secure subsystem of the operating system or a "virtual" smart card that relies on code obfuscation techniques), or an on-line service out of a user's reach. As noted, devices may incorporate biometric access controls to provide greater security. Thus, while embodiments below are illustrated using a hardware device, it should be appreciated that similar embodiments can be implemented using software module security artifacts. Similarly, rather than binding a cryptographic device to several accounts, embodiments may bind multiple devices to the same account.

A user may acquire a device through any one or more of a number of possible methods. For example, a user may acquire a device through an existing relationship with an organization, such as a bank, employer, government body, etc. In another example, a user may acquire a device by purchasing a mobile phone. In another example, a user may acquire a device directly from a retail electronics store. Other methods may be additionally or alternatively used.

The device may be bound to a user's account before it is used for authentication. The binding process will depend on the proofing requirements of the identity provider. For example, one organization may use in-person proofing in which the user must be physically present for identity verification for the device to be bound to the user's account. On the other hand, a different organization may be satisfied with knowledge-based identity verification in which the user must provide some private data that will be matched against the user's account (e.g. account number, date of birth, etc.). Depending on how the user acquired the device, it may or may not have already been bound to a digital identity from a specific identity provider. For example, if the user acquired the device from a bank, the device may be provided to the user after it has already been bound to an account at the bank. In any case, the device can still be bound to multiple independent identities and/or user accounts.

In some embodiments, the process of binding to an account involves generating a unique identifier, or pseudonym, for the relationship between the device and the service provider. Note that as used herein, unique is not an absolute, but is rather a relative term with respect to a given operating environment, system, time period, etc. This same pseudonym is used when the device is used with this service and the service provider associates the pseudonym with the user's account. The device does not use the same pseudonym with different service providers, ensuring that activity is not correlated across service providers.

Various options exist for creating a pseudonym. The device itself could generate the pseudonym based on an identifier for the service provider, using some function that will create the same pseudonym based on the same inputs. In an alternative embodiment, the pseudonym could be generated randomly and then associated with both the device and the service provider, either by the device itself, some client software, or some other service. If the pseudonym is generated outside the device, the parties that know the pseudonym may affect the security or privacy characteristics of the system. Thus, these alternative embodiments may implement additional security considerations, such as using a trusted pseudonym provider or other actions to ensure the security of the pseudonym, such as actions making sure that only the user can prove ownership of the pseudonym, actions to protect the pseudonym's secrecy, etc.

Once bound to an account, future authentication to that account can be done with the device. For example, a user authenticating to her bank online can use the device for authentication.

Multiple devices can also be bound to a specific account. For example, the same user could bind her mobile phone to the same account and use it for strong authentication when banking online using her mobile device.

As illustrated in detail below, the device can be used to authenticate directly to the service provider upon access. Alternatively or additionally, it can also be used to protect ephemeral or long-lived security tokens that have been issued for one or multiple uses.

Embodiments may be implemented where each account that is bound to the device is blind to any other accounts that may be bound to that device, so that a given service that authenticates a user cannot determine for what other accounts the device may be used.

The device itself may be available in multiple forms, including but not limited to: a USB dongle with a fingerprint reader; a smartcard that may contain a keypad on the card itself; a SIM card in a mobile phone; a TPM chip on a laptop, etc.

In each case, the device is capable of performing cryptographic operations to prove its presence during authentication. In some embodiments, it may be convenient if the device is capable of accepting the second factor (fingerprint, PIN, etc.) directly on the device itself to minimize software footprint. However, other embodiments may not include provisions for the second factor on the device.

While the preceding examples have illustrated embodiments where the device is embodied as a physical piece of portable hardware, embodiments may implement security artifacts using a software/service-only implementation in which software can provide the functionality similar to the device. In particular, a security artifact may include a software module implemented on a computer system by storing computer readable instructions in one or more physical computer readable media and executing the computer readable instructions using one or more processors.

Figure 1A:
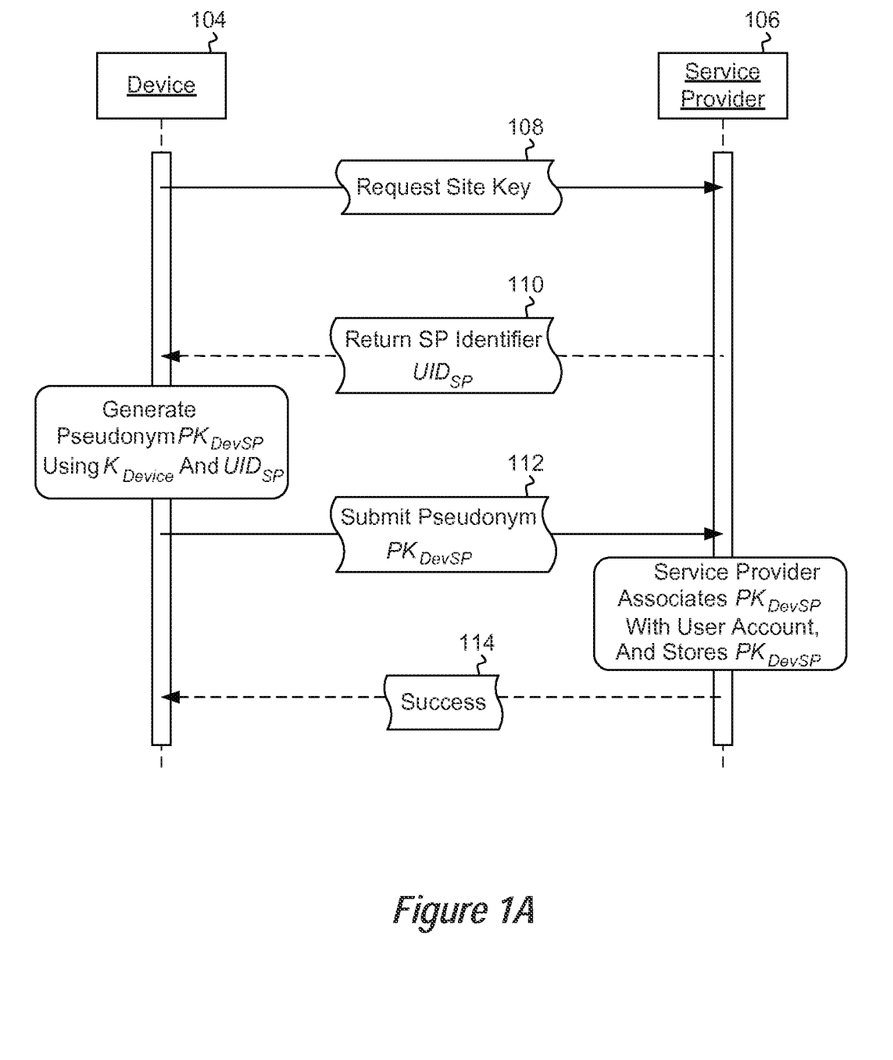
FIG. 1A illustrates binding a security device to a service provider.
Figure 1B:
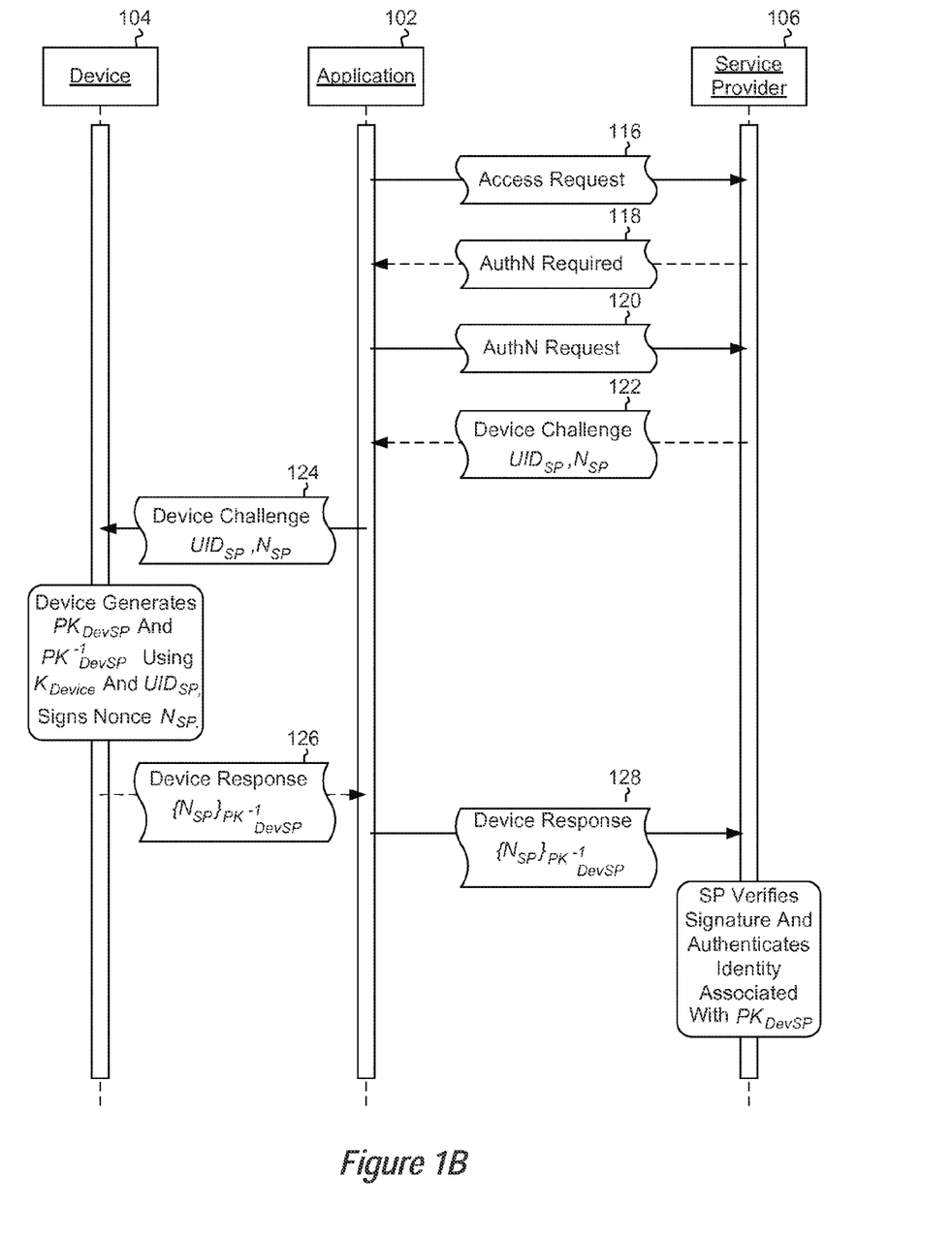
FIG. 1B illustrates using a security device bound to a service provider.

FIGS. 1A and 1B are used in an explanation of the conceptual message sequences for both binding the device to an identity and using the device during authentication. In the following example, an application 102 (FIG. 1B) is software being used to make an access request. For example, in some embodiments, this may be a browser. A device 104 is a cryptographic device that binds an additional authentication factor to multiple identities. A service provider 106 is an entity that has account information for the user. $UID_{SP}$ is the identifier of the service provider 106. $P_{KDevSP}$ is a public key that serves as a pseudonym for the combination of the device 104 and the service provider 106, unique to that combination and not shared between service providers 106.

$PK^{-1}_{DevSP}$ is the private key corresponding to the device public key $PK_{DevSP}$. $K_{Device}$ is a unique secret for the device 104. This secret is not released from the device 104. $N_{SP}$ is a nonce created by the service provider 106. The nonce may be a unique number that is not reused. For example, the nonce may be a large random number, or a timestamp or a counter appended to a unique service provider identifier. Service providers could allow users to pick their own nonce, assuming the users or the service providers can verify the uniqueness of proposed nonces. In some embodiments, data other than a nonce may be used.

Referring now to FIG. 1A, a method of binding a device to a service provider account is illustrated. In FIG. 1A, a device 104 sends a request 108 to a service provider 106 for a site identifier. The service provider 106 returns message 110 including an identifier $UID_{SP}$ to the device 104.

At the device 104, a pseudonym $PK_{DevSP}$ is securely created using $K_{Device}$ and $UID_{sp}$. For example, a hashing algorithm or key generation algorithm may be used with $K_{Device}$ and $UID_{SP}$ as inputs to produce the pseudonym $PK_{DevSP}$. The pseudonym could also be stored and associated with the service provider, to avoid re-generating the pseudonym every time. The device 104 sends a message 112 including the pseudonym $PK_{DevSP}$ to the service provider 106. Inasmuch as the pseudonym $PK_{DevSP}$ is created using $K_{Device}$ and $UID_{SP}$, the device 104 can create a unique pseudonym for each service provider. Embodiments may be implemented where given the same inputs, the same pseudonym will be generated such that for any pair of device and service provider 106 there will be only one pseudonym. Additionally, the service provider 106 cannot discover the secret $K_{Device}$, because $PK_{DevSP}$ was generated using a cryptographically strong algorithm.

The service provider 106 associates the pseudonym $PK_{DevSP}$ with a user account corresponding to the device 104 and stores the pseudonym $PK_{DevSP}$. In the example illustrated, the service provider 106 may send a message 114 back to the device indicating that associating the pseudonym $PK_{DevSP}$ was successful. The preceding process can be repeated with additional service providers, such that the device 104 can be used for authentication with several service providers without the other compromising security or privacy between the device and the different service providers. Additionally or alternatively, the process described above can be repeated with the same service provider 106, but with different devices. This allows for multiple devices to be used individually for authentication to a single service provider 106.

Referring now to FIG. 1B, an example of using a device bound to an account is illustrated. FIG. 1B illustrates that an application 102 sends a message 116 to a service provider 106 requesting access to services provided by the service provider. The service provider 106 returns a message 118 to the application 102 indicating that to access the services, authentication is required. The application sends a message 120 to the service provider 106 requesting authentication. In particular, the message 120 may initiate an authentication protocol to authenticate a user of the application 102 to allow the application to access the requested services. In some embodiments, messages 118 and 120 can be eliminated from the protocol, but rather the access request message 116 could be responded to with a device challenge message 122 as described in more detail below.

The service provider sends a device challenge message 122 to the application 102. The device challenge message 122 includes the service provider identifier $UID_{SP}$ and a nonce $N_{sp}$. The application 102 sends a device challenge message 124 including the service provider identifier $UID_{SP}$ and a nonce $N_{SP}$ to the device 104.

The device 104 generates or looks up the previously generated public key $PK_{DevSP}$ that serves as a pseudonym for the combination of the device 104 and the service provider 106 and $PK^{-1}_{DevSP}$ which is the private key corresponding to the pseudonym $PK_{DevSP}$ using $K_{Device}$, the a unique secret for the device and $UID_{SP}$ the unique identifier of the service provider 106. In some embodiments, when the public key or pseudonym $PK_{DevSP}$ is stored by the device 104 in a known location, it only needs to be retrieved by the device 104. The device 104 also signs the nonce $N_{SP}$ using the private key $PK^{-1}_{DevSP}$. Having done this, the device 104 responds to the device challenge message 124 by sending a fresh signature on the nonce $N_{SP}$ in a device response message 126 to the application 102. The application 102 sends the signature on the nonce $N_{SP}$ to the service provider 106 in a device response message 128 in response to the device challenge message 122.

The service provider 106 validates the signature and authenticates the identity associated with the pseudonym $PK_{DevSP}$. This may be done using the pseudonym $PK_{DevSP}$ provided in the message 112 illustrated in FIG. 1A. As such, the service provider is now able to provide appropriate services to the application 102.

Figure 1C:
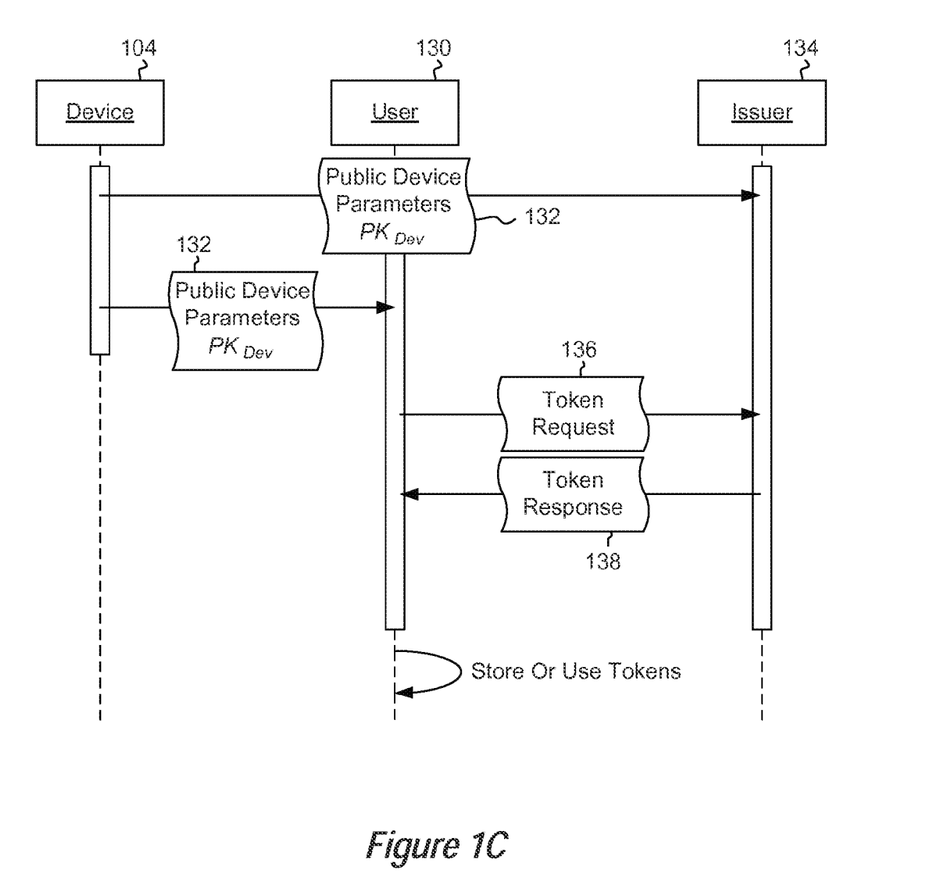
FIG. 1C illustrates a token issuance scenario.
Figure 1D:
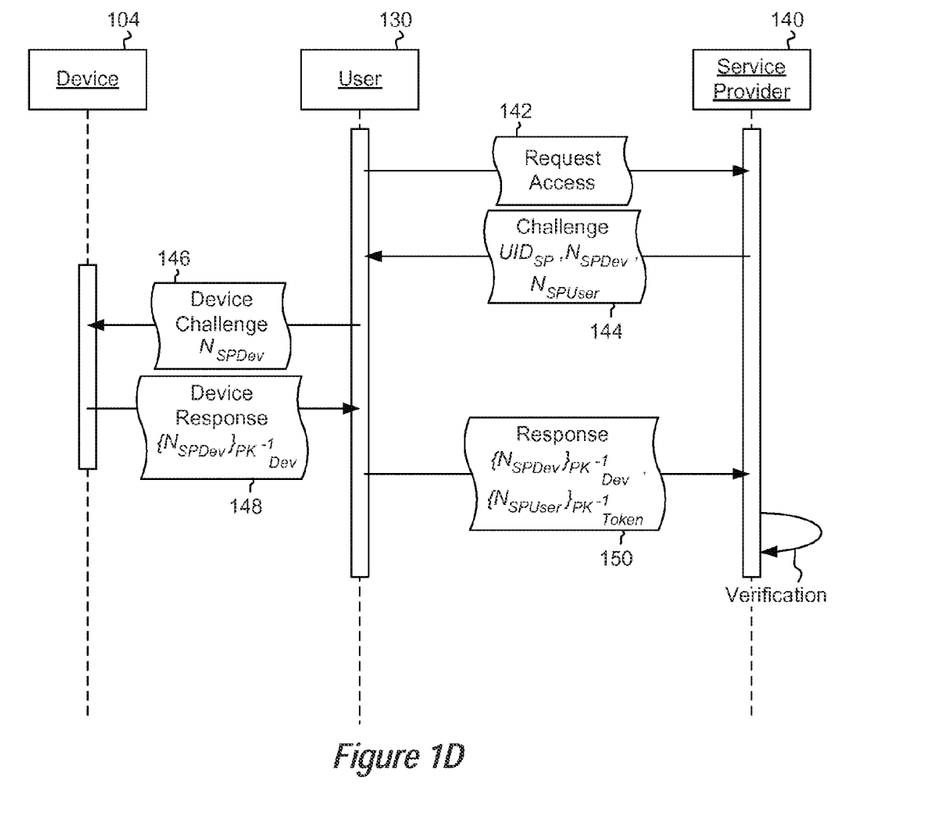
FIG. 1D illustrates a token presentation scenario.

FIGS. 1C and 1D illustrate an example related to token issuance and token presentation that include features of some embodiments. FIG. 1C illustrates a device 104 that is provisioned to a user 130. The device 104 contains a secret (such as $K_{Device}$ illustrated above) where the secret is known only to the device 104. Public device parameters 132 illustrated as $PK_{Dev}$ correspond to the secret. The public device parameters 132 can be used to interact with the device 104 and verify its computations. In one embodiment, the device 104 makes its public device parameters 132 available to a token issuer 134. In other embodiments, the issuer 134 could create the public device parameters and install them on the device 132. Additionally, it should be noted that a device issuer that provides the device 104, is not necessarily the same entity as the token issuer 134. While they could be the same entity, having different entities provide devices and tokens can be achieved without compromising security and privacy characteristics of security tokens. The public device parameters 132 allow the issuer 134 to bind issued tokens to the device 104.

The device 104 also makes its public device parameters 132 available to a user 130. The user 130 may be, for example, an application or other entity that may have need of accessing a service that requires a token for granting access. The public device parameters 132 allow the user 130 to use issued tokens protected by the device 104. Providing the public device parameters 132 to the user 130 and the issuer 134 may happen in advance and the public device parameters 132 may be persisted at the user 130 and/or the issuer 134 for later use.

To obtain a token, the user 130 sends a token request 136 requesting a token from the issuer 134. The issuer 134 computes a response 138 using its own secret and the public device parameters 132, and returns the response 138, such as a token, to the user 130. A returned token may also contain whatever information the token was originally supposed to contain. In particular, the token request 136 may include information that a user wants embedded in a token. The computed response 138 may include this information. Sending a token request 136 and receiving a token response 138 can be repeated numerous times, for example, following a multi-leg challenge-response pattern.

The user 130 may create one or more tokens and corresponding token secrets (e.g. public and private keys $PK_{Token}$ and $PK^{-1}_{Token}$) from the token response 138 from the issuer.

The user 130 stores the tokens and token secrets for later use, or uses one or more of them immediately.

Referring now to FIG. 1D, an example of token presentation is illustrated. The user 130 requests access to the service provider 140 with an access request 142. The service provider 140 returns a challenge 144 to the user 130. The service provider challenge 144, in the example illustrated, includes an identifier $UID_{SP}$ for the service provider 140, a nonce $N_{SPDev}$ and a nonce $N_{SPUser}$. While in the example illustrated, two nonces are sent, it should be appreciated that other information could be sent as well. In particular, where a signature on a nonce is indicated below, a signature on other sent information could work as well. However, it may be beneficial to send only a nonce to the device 104 to reduce network traffic and resource usage at the device 104.

The user 130 creates a device challenge 146 from the service provider challenge 144. In some embodiments, the device challenge 146 could be one or more of: the service provider challenge 144 as-is, a subset of the service provider challenge 144, or a transformed version of the service provider challenge 144. In the particular example, the device challenge 146 includes the nonce $N_{SPDev}$ but not the nonce $N_{SPUser}$ of the service provider challenge 144. The user 130 engages in a challenge-response protocol with the device 104. The device 104 computes a response 148 using its secret $PK^{-1}_{Dev}$ and the device challenge 146, including in this example, the nonce $N_{SPDev}$, and returns it to the user 130. Thus, the device response 148 includes a signature using $PK^{-1}_{Dev}$ on the nonce $N_{SPDev}$. Sending a device challenge 146 and receiving a device response 148 may be repeated multiple times for example, following a multi-leg challenge-response pattern. The user 130 computes a response 150 using the token secret (e.g. $PK^{-1}_{Token}$), the service provider challenge 144, and the device response 148, and sends it to the service provider 140. Thus, in the present example, the response 150 includes a signature using $PK^{-1}_{Dev}$ on the nonce $N_{SPDev}$ and a signature using $PK^{-1}_{Token}$ on the nonce $N_{SPUser}$. The service provider 140 verifies the response 150. The response 150 is valid if the device 104 bound to the token was involved in the token presentation.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
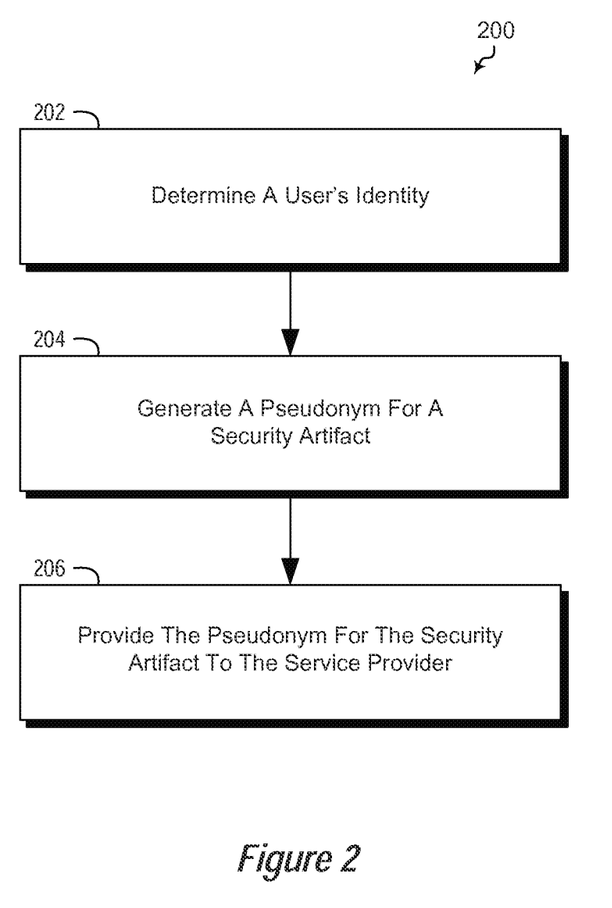
FIG. 2 illustrates a method of binding a security artifact to a service provider.

Referring now to FIG. 2, FIG. 2 illustrates a method 200 that may be practiced in a computing environment. The method 200 includes acts for binding a security artifact (such as for example a device 104 as illustrated in FIGS. 1A, 1B, 1C, and 1D) to a user account at a service provider. The method includes determining a user's identity (act 202). In particular a service provider, as shown in more detail below, needs to know to what account a pseudonym is to be bound.

The method further includes generating a pseudonym for a security artifact (act 204). The pseudonym is an identifier of the security artifact to the service provider that is unique to the service provider. In particular, the pseudonym is not used to identify the security artifact to other service providers. Further, the security artifact uniquely identifies the particular security artifact to the service provider even when a user has available different security artifacts to authenticate to the same service provider to access a user account for the user. For example, as illustrated in FIG. 1A the pseudonym may be a public key of an asymmetric key pair.

The method 200 further includes providing the pseudonym for the security artifact to the service provider (act 206). The pseudonym for the security artifact is bound with the user account at the service provider for a user associated with the security artifact.

The method 200 may be practiced where generating a pseudonym for a security artifact includes using a service provider identifier. The service provider identifier uniquely identifies a service provider. For example, $UID_{SP}$ illustrated above may be an example of a unique service provider identifier. Generating a pseudonym may include using a security artifact secret. The security artifact secret uniquely identifies the security artifact. In the example illustrated above $K_{Device}$ is an example of a security artifact secret.

The method 200 may be practiced where wherein generating a pseudonym for a security artifact includes the security artifact generating the pseudonym. Some such embodiments may be practiced where the act of providing the pseudonym for the security artifact to the service provider includes the security artifact providing the pseudonym to the service provider as part of a binding protocol exchange.

In an alternative embodiment, the method 200 may be practiced where generating a pseudonym for a security artifact includes randomly generating the pseudonym. The pseudonym is then associated with both the security artifact and the service provider. For example, the pseudonym may be randomly generated by some external organization that then provides the pseudonym to the security artifact and the service provider. As noted above, when an external organization provides the pseudonym, additional security and privacy considerations are taken into account such as ensuring that the external organization is a trusted organization.

The method 200 may be practiced where the pseudonym for the security artifact with respect to the service provider includes a public key of an asymmetric key pair. Thus, in this example, the service provider may have the public key for later authentication, such as that described below in FIG. 3.

The method 200 may be practiced where the acts of the method 200 are repeated with the same security artifact, but with a different service provider. This results in generating a different pseudonym that is used by the same security artifact with the different service provider. This facilitates using a same security artifact, but nonetheless having unlinkability across service providers. Namely, even though the same security artifact is used, one service provider cannot use this information to determine information about another service provider due to the use of the pseudonym. Thus, a single security artifact can be used for authentication with multiple service providers, but with a different pseudonym for each.

The method 200 may be practiced where the acts of the method 200 are repeated with a different security artifact, but with the same service provider. This results in generating a different pseudonym that is used by the different security artifact with the same service provider. In this way, a user account is associated with a number of different security artifacts, any one or more of which may be used to access the user account. Thus, a user may have a number of selections for accessing the user account. For example the user may have a cell phone and a smart card. If one of these is not available to the user, then the user can use the other one to access the user account.

The method 200 may be practiced where the security artifact includes a portable hardware device. For example, such a hardware device may be a USB dongle, a smart chip on a card or a SIM card in mobile phone. In some embodiments, the portable hardware device includes functionality for accepting second factor authentication. For example, the portable hardware device may include provisions for biometric validation or pin entry.

The method 200 may be practiced where the security artifact is software based. For example, the security artifact may include a software module implemented on a computer system by storing computer readable instructions in one or more physical computer readable media and executing the computer readable instructions using one or more processors.

The method 200 may further include using the security artifact to authenticate directly to the service provider upon access. In an alternative embodiment, the method 200 may further include using the security artifact to protect ephemeral or long-lived security tokens (such as U-Prov tokens SAML tokens, PKI certificates) that have been issued for one or multiple uses.

Figure 3:
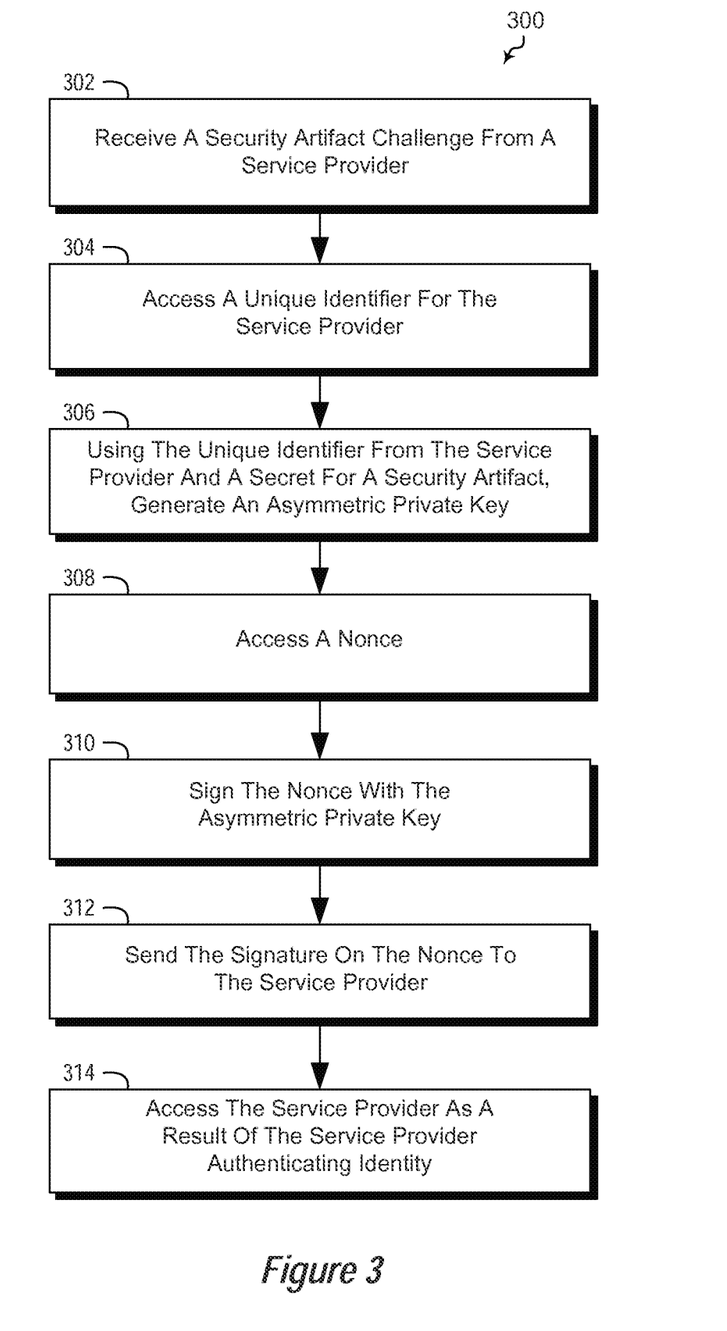
FIG. 3 illustrates a method of using a security artifact bound to a user account at a service provider.

Referring now to FIG. 3, a method 300 is illustrated. The method 300 may be practiced in a computing environment. The method 300 includes acts for using a security artifact bound to a user account at a service provider.

The method 300 includes receiving a security artifact challenge from a service provider (act 302). The method 300 further includes accessing a unique identifier for a service provider (e.g. $UID_{SP}$ illustrated above) (act 304). Accessing the unique identifier may be done in a number of ways. For example, the identifier may be sent as part of a security artifact challenge as illustrated above. Alternatively, accessing the unique identifier may be done by referencing some known location, such as a service or even a local store.

The method 300 further includes using the unique identifier from the service provider and a unique secret for a security artifact to generate an asymmetric private key (act 306). For example, FIG. 1B illustrates using $UID_{SP}$ and $K_{Device}$ to generate $PK^{-1}_{DevSP}$.

The method 300 further includes accessing a nonce (act 308). In one embodiment, the nonce may be provided in the security artifact challenge. In an alternative embodiment, the nonce could be obtained from some third party. In yet another alternative embodiment, a service provider could allow users to pick their own nonce, assuming they can verify the uniqueness of proposed nonces.

The method 300 further includes signing the nonce with the asymmetric private key (act 310). For example, FIG. 1 illustrates the nonce $N_{SP}$ is signed by the private key $PK^{-1}_{DevSP}$.

The method 300 further includes sending the signature on the nonce to the service provider (act 312). The service provider validates the signature on the nonce to authenticate the identity. The method 300 further includes accessing the service provider as a result of the service provider authenticating the security artifact (act 314). This may be accomplished by the service provider matching the security artifact with the appropriate account to authenticate the requestor.

The method 300 may be practiced where sending the signature on a nonce to the service provider includes sending the signature on a nonce to an application which forwards the signature to the service provider. An example of this is illustrated in FIG. 1B by messages 126 and 128.

The method 300 may be practiced where the security artifact challenge is received as a result of an application sending an access request. An example of this is illustrated in FIG. 1B by messages 116, 122 and 124.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
    one or more hardware processors; and
    computer storage memory containing executable instructions which, when executed by the one or more hardware processors, cause the computing system to bind a security artifact to one or more user accounts in a manner that permits the security artifact to be used for authentication with any of several service providers for the user accounts without compromising security between the security artifact and any of said several service providers, and wherein the computing system is configured by the executable instructions to perform the following process:
        access a first pseudonym for a security artifact comprising at least one of a cryptographic hardware device or a software module, the first pseudonym providing an authentication factor that is reusable across accounts used at any of several different service providers to authenticate to the different service providers;
        provide the first pseudonym for the security artifact to a first service provider, the first pseudonym for the security artifact being bound with a user account at the first service provider in order to uniquely identify the security artifact to the first service provider over any other service provider;
        access a second pseudonym, different than the first pseudonym, for the same security artifact accessed by the first pseudonym, the second pseudonym comprising an identifier of the same security artifact to a second service provider, different than the first service provider; and
        provide the second pseudonym for the security artifact to a second service provider, the second pseudonym for the security artifact being bound with a user account at the second service provider in order to uniquely identify the same security artifact to the second service provider over any other service provider, the first and second pseudonyms thereby permitting use of the same security artifact at the first and second service providers but without compromising security between the first and second service providers.

2. The computing system of claim 1, wherein accessing the first pseudonym for the security artifact comprises using a service provider identifier to generate the first pseudonym for the security artifact, the service provider identifier uniquely identifying the first service provider, and a security artifact secret, the security artifact secret uniquely identifying the security artifact.

3. The computing system of claim 1, wherein accessing the first pseudonym for the security artifact comprises the security artifact generating the first pseudonym and wherein providing the first pseudonym for the security artifact to the first service provider comprises the security artifact providing the first pseudonym to the first service provider as part of a binding protocol exchange.

4. The computing system of claim 1, wherein accessing the first pseudonym for the security artifact comprises randomly generating the first pseudonym and thereafter the first pseudonym is associated with both the security artifact and the first service provider.

5. The computing system of claim 1, wherein the first pseudonym for the security artifact comprises a public key of an asymmetric key set.

6. The computing system of claim 1, wherein the process of claim 1 is repeated with a different security artifact, but with the same first service provider, resulting in generating a different pseudonym that is used by the different security artifact with the same first service provider, such that the user account at the first service provider is associated with a plurality of different security artifacts, any one or more of which may be used to access the user account at the first service provider.

7. The computing system of claim 1, wherein the security artifact comprises a portable hardware device including at least one of a USB dongle, smart chip on a card or a SIM card in mobile phone.

8. The computing system of claim 1, wherein the security artifact includes functionality for accepting second factor authentication including at least one of provisions for biometric validation or pin entry.

9. The computing system of claim 1, wherein the security artifact comprises a software module implemented by storing computer readable instructions in one or more physical computer readable media devices and executing the computer readable instructions using one or more hardware processors.

10. The computing system of claim 1, wherein the one or more computer readable media further comprise computer executable instructions that when executed by at least one of the one or more hardware processors cause the computing system to use the security artifact to authenticate directly to the first service provider upon access.

11. The computing system of claim 1, wherein the one or more computer readable media further comprise computer executable instructions that when executed by at least one of the one or more hardware processors cause the computing system to use the security artifact to protect one or more ephemeral or long-lived security tokens that have been issued for one or multiple uses.

12. A computer-implemented method performed by one or more hardware processors executing computer executable instructions for the computer-implemented method, and the computer-implemented method comprising:
    as a first process, performing the following:
        accessing a unique identifier for a first service provider;
        using the unique identifier from the first service provider and a unique secret for a security artifact, generating a first key and a first pseudonym for the security artifact, the first pseudonym providing an authentication factor that is reusable across accounts used at any of several different service providers to authenticate to the different service providers;

providing the first pseudonym for the security artifact to the first service provider, the first pseudonym for the security artifact being bound with a user account at the first service provider in order to uniquely identify the security artifact to the first service provider over any other service provider;

performing cryptographic operations to prove the presence of the security artifact during authentication with the first service provider, and then accessing the a user account provided at the first service provider as a result of authenticating the security artifact; and as a second process, repeating the first process for the same security artifact, but with a second service provider that is different than the first service provider, such that the same security artifact is used with the second service provider using a second pseudonym, different from the first pseudonym, for the same security artifact; and the first and second pseudonyms thereby permitting the same security artifact to be bound to user accounts provided by the first and second service providers but without compromising security between the first and second service providers.

13. The computer-implemented method of claim 12, wherein performing cryptographic operations comprises:
   receiving a security artifact challenge from a service provider;
   accessing a nonce;
   signing the nonce with an asymmetric private key; and
   sending the signature on the nonce to the service provider, so that the service provider thereafter validates the signature on the nonce using the pseudonym of the security artifact to authenticate the security artifact.

14. The computer-implemented method of claim 13, wherein sending the signature on the nonce to the service provider comprises sending the signature on the nonce to an application which forwards the signature to the service provider.

15. The computer-implemented method of claim 12, wherein the security artifact challenge is received as a result of an application sending an access request.

16. The computer-implemented method of claim 12, wherein the security artifact comprises a portable hardware device including at least one of a USB dongle, smart chip on a card or a SIM card in mobile phone.

17. The computer-implemented method of claim 12, wherein the security artifact comprises a software module implemented on a computer system by storing computer readable instructions in one or more physical computer readable media devices and executing the computer readable instructions using one or more hardware processors.

18. A computer storage device comprising computer executable instructions which, when executed by one or more hardware processors, cause the one or more hardware processors to perform a computer-implemented method comprising:
   accessing a first pseudonym for a security artifact comprising at least one of a cryptographic hardware device or a software module, the first pseudonym providing an authentication factor that is reusable across accounts used at any of several different service providers to authenticate to the different service providers;
   providing the first pseudonym for the security artifact to a first service provider, the first pseudonym for the security artifact being bound with a user account at the first service provider in order to uniquely identify the security artifact to the first service provider over any other service provider;
   accessing a second pseudonym, different than the first pseudonym, for the same security artifact accessed by the first pseudonym, the second pseudonym comprising an identifier of the same security artifact to a second service provider, different than the first service provider;
   providing the second pseudonym for the security artifact to a second service provider, the second pseudonym for the security artifact being bound with a user account at the second service provider in order to uniquely identify the same security artifact to the second service provider over any other service provider; and
   the first and second pseudonyms thereby permitting the same security artifact to be bound to user accounts provided by the first and second service providers but without compromising security between the first and second service providers.

19. The computer storage device of claim 18, wherein the pseudonym is generated using the service provider unique identifier and a security artifact secret unique to the security artifact, wherein the pseudonym comprises a public key of an asymmetric key pair.

* * * * *